United States Patent
Lu

(10) Patent No.: US 8,634,207 B2
(45) Date of Patent: Jan. 21, 2014

(54) ELECTRONIC DEVICE HAVING LEVER WITH PRECISION PIVOT

(75) Inventor: Hung-Chun Lu, New Taipei (TW)

(73) Assignee: Hon Hai Precision Industry Co., Ltd., New Taipei (TW)

(*) Notice: Subject to any disclaimer, the term of this patent is extended or adjusted under 35 U.S.C. 154(b) by 327 days.

(21) Appl. No.: 13/220,704

(22) Filed: Aug. 30, 2011

(65) Prior Publication Data

US 2013/0003338 A1    Jan. 3, 2013

(30) Foreign Application Priority Data

Jun. 28, 2011  (TW) .............................. 100122553 A

(51) Int. Cl.
*H05K 7/02* (2006.01)
(52) U.S. Cl.
USPC ............................ 361/807; 361/801; 361/802

(58) Field of Classification Search
USPC .......................................... 361/807, 801, 802
See application file for complete search history.

(56) References Cited

U.S. PATENT DOCUMENTS

| | | | |
|---|---|---|---|
| 4,104,491 A * | 8/1978 | Duble ........................ | 200/50.15 |
| 5,082,387 A * | 1/1992 | DeVries ..................... | 403/146 |
| 2006/0115350 A1* | 6/2006 | Weis ........................... | 414/139.4 |
| 2009/0016011 A1* | 1/2009 | Wade ........................... | 361/684 |

* cited by examiner

*Primary Examiner* — Forrest M Phillips
(74) *Attorney, Agent, or Firm* — Altis Law Group, Inc.

(57) ABSTRACT

An exemplary electronic device includes a housing, a lever, and a locking device securing the lever on the housing. The housing includes a bottom plate, a top plate and a side plate connecting the bottom plate with the top plate. The locking device includes a nut having a main body extending downwardly into the lever, a screw extending upwardly through the top plate into the nut, and elastically deformable gaskets sandwiched between the top plate and the nut. The lever is disposed on the top plate and sleeved on a pole of the nut. The lever is pressed by a head of the nut against the top plate.

20 Claims, 3 Drawing Sheets

ELECTRONIC DEVICE HAVING LEVER WITH PRECISION PIVOT

BACKGROUND

1. Technical Field

The present disclosure relates to electronic devices, and more particularly, to an electronic device having a lever.

2. Description of Related Art

Storage Bridge Bay (SBB) canisters are widely used for providing standard mechanical/electrical interfaces between passive backplane drive arrays and electronic packages. An SBB canister includes a housing receiving electronic elements, and a pair of levers attached on the housing. The levers are pivotable about the housing between an open position in which the SBB canister can be inserted into an enclosure and a closed position in which the SBB canister is fixed within the enclosure by locking the levers with the enclosure. Generally, each lever is attached to the housing by extending a rivet through the lever and the housing and then punching the rivet to deform ends of the rivet. However, this fixing method may result in the levers and the housing being too tightly held to each other by the rivets. When this happens, it is difficult to rotate the levers about the housing. This problem hinders normal assembly of the SBB canister to the enclosure.

What is needed, therefore, is an electronic device having a lever which can overcome the limitations described above.

BRIEF DESCRIPTION OF THE DRAWINGS

Many aspects of the present disclosure can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the views.

DETAILED DESCRIPTION

Figure 1:
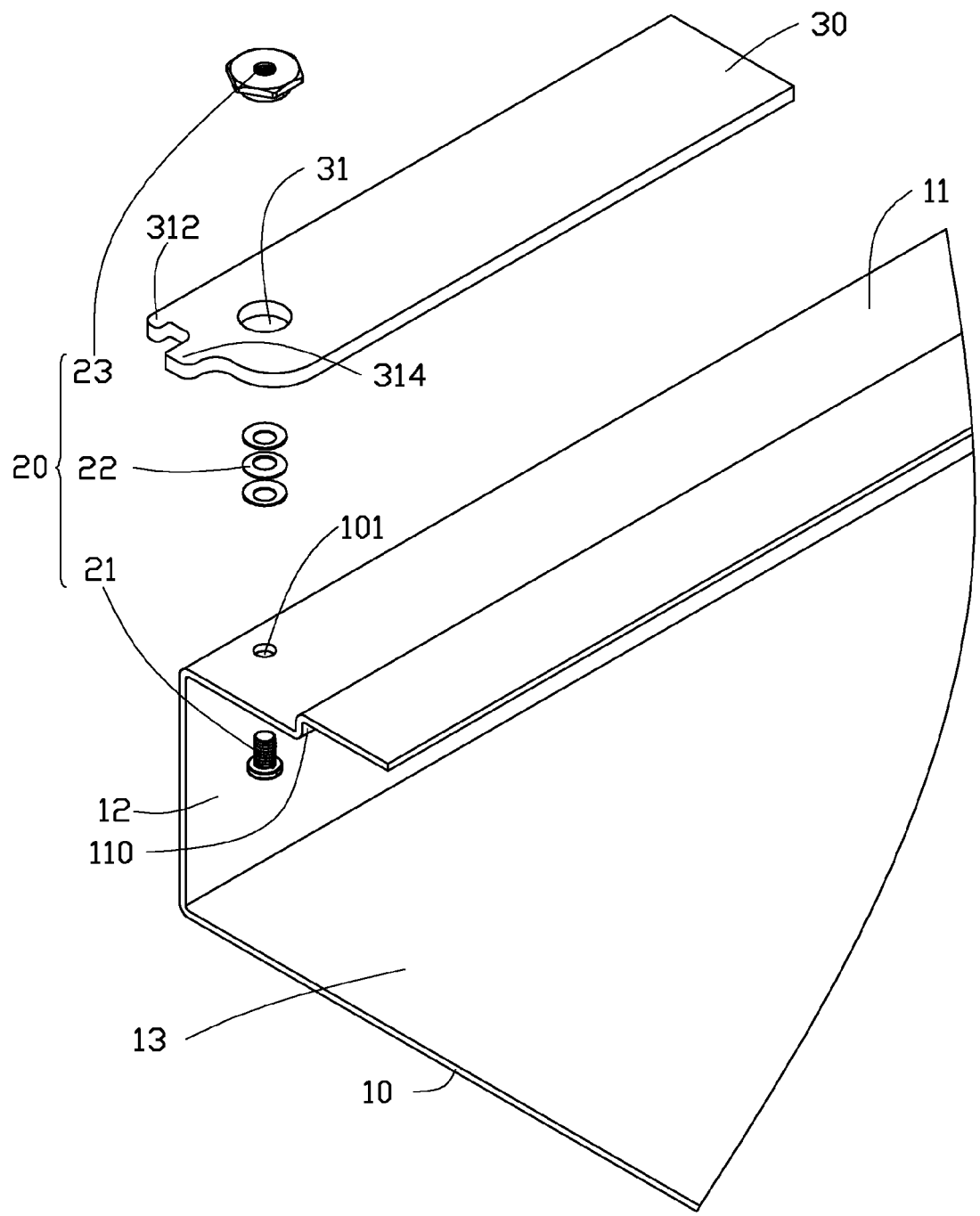
FIG. 1 is an isometric, exploded view of part of an SBB canister of an embodiment of the present disclosure.

Referring to FIG. 1, an SBB (Storage Bridge Bay) canister in accordance with an embodiment of the present disclosure is shown. The SBB canister includes a housing 10, a lever 30, and a locking device 20 pivotably fixing the lever 30 on the housing 10.

The housing 10 is made of metal or other strong material. The housing 10 includes a bottom plate 13, a side plate 12 extending upwardly and perpendicularly from a lateral side of the bottom plate 13, and a top plate 11 extending horizontally and perpendicularly from a top side of the side plate 11. The top plate 11 forms a step 110 at a middle portion thereof. The step 110 is for blocking the lever 30, and thus preventing the lever 30 from over-rotating. The top plate 11 defines an aperture 101 next to the top side of the side plate 12.

The lever 30 is made of a rigid material such as metal. The lever 30 forms a first cam 310 and a second cam 312 at an end thereof. The first cam 310 and the second cam 312 are adjacent to each other. The lever 30 defines a hole 31 neighboring the first cam 310 and the second cam 312, for extension of the locking device 20 through the lever 30. The hole 31 has a diameter larger than that of the aperture 101.

Figure 2:
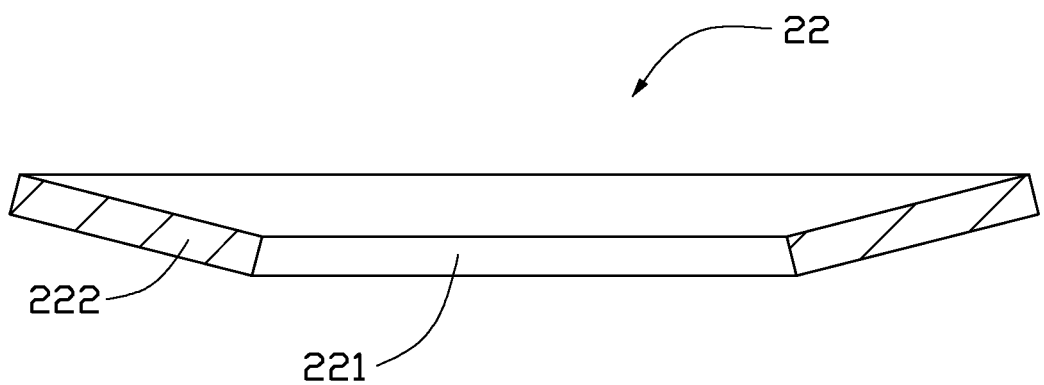
FIG. 2 is an enlarged, cross-section of a gasket of the SBB canister of FIG. 1.
Figure 3:
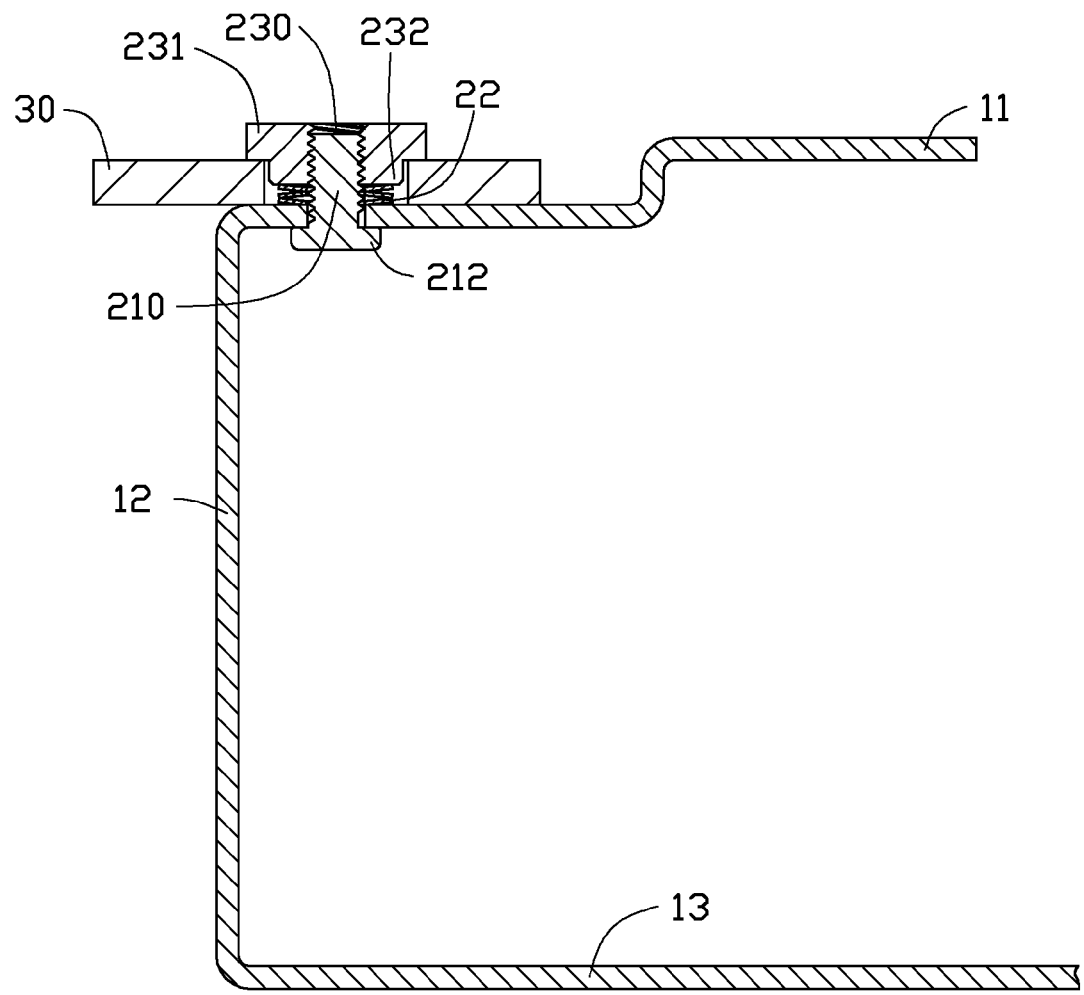
FIG. 3 is a cross-section of the SBB canister of FIG. 1 when the SBB canister is assembled.

Also referring to FIGS. 2-3, the locking device 20 includes a screw 21, a nut 23, and three metal gaskets 22 located between the screw 21 and the nut 23. The screw 21 extends through the aperture 101 of the top plate 11 from below the top plate 11. A head 212 of the screw 21 abuts against a bottom face of the top plate 11, and a pole 210 of the screw 21 extends through the aperture 101 and is exposed above the top plate 11. The head 212 of the screw 21 has an outer diameter larger than that of the pole 210. The nut 23 extends into the hole 31 of the lever 30 from above the lever 30. A head 231 of the nut 23 abuts against a top face of the lever 30, and a main body 232 of the nut 23 is substantially fully received within the hole 31 of the lever 30. The main body 232 of the nut 23 has an outer diameter smaller than that of the head 231 of the nut 23, and larger than that of the pole 210 of the screw 21. The nut 23 defines a screw hole 230 extending from a top to a bottom thereof. The screw 21 is threadedly fixed to the nut 23 by extending the pole 210 of the screw 21 into the screw hole 230 of the nut 23.

The gaskets 22 are sleeved on the pole 210 of the screw 21 and sandwiched between a bottom face of the main body 232 of the nut 23 and a top face of the top plate 11. Each gasket 22 defines a through hole 221 in a center thereof, and the body of the gasket 22 surrounding the through hole 221 is an inclined, annular sidewall 222. For a middle one of the three gaskets 22, the sidewall 222 thereof is sloped downwardly from a middle of the gasket 22 to an outer periphery of the gasket 22. For each of an upper one and a lower one of the three gaskets 22, the sidewall 222 thereof is sloped upwardly from a middle of the gasket 22 to an outer periphery of the gasket 22. That is, the gaskets 22 are stacked with each other in a manner such that each two adjacent gaskets 22 are symmetrically opposite each other. Each gasket 22 has an outer diameter smaller than that of the main body 232 of the nut 23, so that the gasket 22 is spaced from and does not contact the lever 30 sleeved on the main body 232 of the nut 23. Each gasket 22 is elastically deformable when compressed along axial directions thereof. That is, when the gasket 22 is compressed, it bends along axial directions and stores elastic potential energy.

A total sum of the axial heights of the three gaskets 22 before they are sandwiched and compressed plus the height of the main body 232 of the nut 23 is larger than a thickness of the lever 30. Therefore when the screw 21 is inserted through the top plate 11 into the nut 23, the gaskets 22 are sandwiched between the top face of the top plate 11 and the bottom face of the main body 232 of the nut 23, and the gaskets 22 are gradually deformed and compressed as the distance between the top face of the top plate 11 and the bottom face of the main body 232 of the nut 23 is gradually reduced. However, since the rigid lever 30 is located between the head 231 of the nut 23 and the top face of the top plate 11, the lever 30 limits the amount of compression of the gaskets 22 and prevents the gaskets 22 from being over-compressed. The compressed gaskets 22 provide elastic connection between the nut 23 and the top plate 11. Thereby, the compressed gaskets 22 help to stop the head 231 of the nut 23 from pressing too tightly down on the lever 30, and help keep the nut 23 in its screwed position without becoming loosened. Thus, the lever 30 is confined on the top plate 11 by the locking device 20 without being too loose nor too tight, and can be operated by a user applying appropriate force to rotate about the locking device 20.

In addition, by controlling the number of gaskets 22, a distance between a bottom face of the head 231 of the nut 23 and the top face of the top plate 11 can be varied according to different levers 30 having different thicknesses. However, in order to ensure that proper pressure acts on the lever 30, as described above, the total sum of the axial heights of the gaskets 22 before they are sandwiched and compressed plus the height of the main body 232 of the nut 23 should be larger than the thickness of the lever 30.

It is believed that the present embodiments will be understood from the foregoing description, and it will be apparent that various changes may be made thereto without departing from the spirit and scope of the present disclosure or sacrificing all of its material advantages, the examples hereinbefore described merely being preferred or exemplary embodiments.

What is claimed is:

1. An electronic device comprising:
   a housing comprising a plate;
   a lever disposed on the plate; and
   a locking device comprising:
      a nut comprising a head abutting against the lever and a main body extending downwardly from the head, the main body of the nut being received in the lever;
      a screw extending upwardly through the plate and threadedly engaged in the nut; and
      a bent gasket sleeved on the screw and elastically compressed between the main body of the nut and the plate;
   wherein the lever is sleeved on the main body of the nut and movably held between the head of the nut and the plate; and
   wherein the bent gasket is received within and surrounded by the lever.

2. The electronic device of claim 1, further comprising another bent gasket elastically compressed between the main body of the nut and the top plate, wherein the another bent gasket is oriented symmetrically opposite to an orientation of the bent gasket.

3. The electronic device of claim 1, further comprising at least another bent gasket elastically compressed between the main body of the nut and the top plate, wherein the total number of bent gaskets is proportional to a thickness of the lever.

4. The electronic device of claim 1, wherein the head of the nut has an outer diameter larger than that of the main body of the nut.

5. The electronic device of claim 1, wherein the bent gasket is made of metal.

6. The electronic device of claim 1, wherein a sum of a height of the bent gasket before being compressed plus a height of the main body of the nut is larger than a thickness of the lever.

7. The electronic device of claim 1, wherein the screw comprises a head and a pole extending upwardly from the head, the pole of the screw having an outer diameter smaller than that of the main body of the nut.

8. The electronic device of claim 7, wherein the head of the screw abuts against a bottom face of the plate.

9. The electronic device of claim 7, wherein the pole of the screw extends through the plate and is threadedly fixed in the main body of the nut.

10. The electronic device of claim 1, wherein the electronic device is a storage bridge bay canister.

11. The electronic device of claim 1, wherein the lever directly contacts a bottom face of the head of the nut.

12. An electronic device comprising:
    a housing comprising a plate;
    a lever disposed on the plate; and
    a locking device comprising:
       a nut comprising a head and a main body, the main body extending downwardly into an end of the lever;
       a screw extending upwardly through the plate into the main body of the nut; and
       an elastically deformable gasket sandwiched between the main body of the nut and the plate and being elastically compressed to hold the nut in position relative to the plate;
    wherein the end of the lever is rotatably sleeved on the main body of the nut and held between the head of the nut and the plate; and
    wherein the gasket is received within and surrounded by the lever.

13. The electronic device of claim 12, wherein the gasket is a bent annulus elastically compressed between a bottom face of the main body of the nut and a top face of the plate.

14. The electronic device of claim 13, further comprising another gasket stacked on the gasket, wherein the gasket and the another gasket are bended towards opposite directions, respectively.

15. The electronic device of claim 13, wherein a sum of a height of the gasket before being compressed plus a height of the main body of the nut is larger than a thickness of the lever.

16. The electronic device of claim 12, wherein the screw comprises a head and a pole extending upwardly from the head, the pole of the screw extending through the plate and being fixed within the nut, and the head of the screw abutting against a bottom face of the plate.

17. The electronic device of claim 12, wherein the plate forms a step for blocking over-rotation of the lever.

18. The electronic device of claim 12, wherein the gasket is spaced from and does not contact the lever.

19. The electronic device of claim 12, wherein the electronic device is a storage bridge bay canister.

20. The electronic device of claim 12, wherein the lever directly contacts a bottom face of the head of the nut.

* * * * *